(12) United States Patent
Nash et al.

(10) Patent No.: US 12,475,583 B2
(45) Date of Patent: Nov. 18, 2025

(54) STEREO VISION WITH CENSUS TRANSFORM

(71) Applicant: QUALCOMM Incorporated, San Diego, CA (US)

(72) Inventors: James Wilson Nash, San Diego, CA (US); Kalin Mitkov Atanassov, San Diego, CA (US); Jason Chung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 18/309,603

(22) Filed: Apr. 28, 2023

(65) Prior Publication Data

US 2024/0362805 A1 Oct. 31, 2024

(51) Int. Cl.
*G06T 7/521* (2017.01)
*G06T 7/593* (2017.01)
*G06V 10/141* (2022.01)
*G06V 10/25* (2022.01)

(52) U.S. Cl.
CPC .............. *G06T 7/521* (2017.01); *G06T 7/593* (2017.01); *G06V 10/141* (2022.01); *G06V 10/25* (2022.01); *G06T 2207/10028* (2013.01)

(58) Field of Classification Search
CPC ......... G06T 2207/10; G06T 2207/1004; G06T 2207/10012; G06T 2207/10016; G06T 2207/10021; G06T 2207/10028; G06T 2207/20048; G06T 2207/20061; G06T 2215/12; G06T 7/37; G06T 7/521; G06T 7/55; G06T 7/564; G06T 7/586; G06T 7/593; G06T 7/596; G06T 7/70; G06V 10/12; G06V 10/14; G06V 10/147; G06V 10/17; G06V 10/20; G06V 10/25
See application file for complete search history.

(56) References Cited

U.S. PATENT DOCUMENTS

| | | | |
|---|---|---|---|
| 10,091,419 B2 * | 10/2018 | John Archibald | .... G06F 1/3215 |
| 10,349,038 B2 * | 7/2019 | Trail | ................ G02F 1/133528 |
| 10,362,296 B2 * | 7/2019 | Price | .................... H04N 13/139 |
| 10,469,722 B2 * | 11/2019 | Trail | ....................... G06F 3/011 |
| 10,694,106 B2 * | 6/2020 | John Archibald | ... G06V 40/167 |
| 11,010,911 B1 * | 5/2021 | Hall | ..................... H04N 13/271 |
| 12,033,339 B2 * | 7/2024 | Keinert | ..................... G06T 7/75 |

(Continued)

OTHER PUBLICATIONS

International Search Report and Written Opinion—PCT/US2024/025497 —ISA/EPO—Jul. 19, 2024.

*Primary Examiner* — John R Lee
(74) *Attorney, Agent, or Firm* — QUALCOMM Incorporated

(57) ABSTRACT

Systems and techniques are provided for wireless communication. For example, a process can include obtaining a first image of an environment, the first image including a pattern of light. The process can further include determining a pixel window for a pixel of the first image; determining a set of transform pixels based on the pattern of light, wherein the set of transform pixels are a subset of pixels from the pixel window; performing a census transform based on the pixel and the set of transform pixels to obtain census transform information for the first image; and generating depth data based on the census transform information for the first image and census transform information for a second image.

30 Claims, 8 Drawing Sheets

(56) References Cited

U.S. PATENT DOCUMENTS

| | | | |
|---|---|---|---|
| 2014/0368626 A1* | 12/2014 | John Archibald | H04N 23/80 |
| | | | 348/61 |
| 2014/0368688 A1* | 12/2014 | John Archibald | H04N 23/611 |
| | | | 348/222.1 |
| 2016/0253812 A1* | 9/2016 | Grossinger | G06T 19/006 |
| | | | 356/614 |
| 2022/0028103 A1 | 1/2022 | Hall et al. | |
| 2024/0362805 A1* | 10/2024 | Nash | G06T 7/521 |

* cited by examiner

STEREO VISION WITH CENSUS TRANSFORM

FIELD

Aspects of the present disclosure generally relate to depth sensing systems. In some cases, systems, apparatuses, methods, and computer-readable media are described that provide improved stereo vision with a census transform.

INTRODUCTION

In some examples, stereoscopic images of a scene may be used to determine depth information relative to the scene. Stereoscopic images may include two images that are captured substantially simultaneously by two cameras with slightly different views into the scene. Stereoscopic images emulate the slightly different perspectives of a scene captured by a person's two eyes. When stereoscopic images are captured by two cameras, the pixels in each of the two images may be correlated to generate depth information. In some cases, stereoscopic imaging techniques may be enhanced by using structured light. In structured light imaging, a light pattern may be projected onto a scene and images captured of the scene with the projected light pattern. The light pattern can be used to assist in correlating pixels from the two images. Additionally, depth information may be estimated based on distortions of the light pattern along with the correlations between the images.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for depth sensing. According to at least one illustrative example, a device for depth sensing is provided. The device includes at least one memory, a light source configured to project a pattern of light into an environment, and at least one processor (e.g., configured in circuitry) coupled to the at least one memory. The at least one processor is configured to: obtain a first image of the environment, the first image including the pattern of light; determine a pixel window for a pixel of the first image; determine a set of transform pixels based on the pattern of light, wherein the set of transform pixels are a subset of pixels from the pixel window; perform a census transform based on the pixel and the set of transform pixels to obtain census transform information for the first image; and generate depth data based on the census transform information for the first image and census transform information for a second image.

In another example, a method for image processing is provided. The method includes obtaining a first image of an environment, the first image including a pattern of light; determining a pixel window for a pixel of the first image; determining a set of transform pixels based on the pattern of light, wherein the set of transform pixels are a subset of pixels from the pixel window; performing a census transform based on the pixel and the set of transform pixels to obtain census transform information for the first image; and generating depth data based on the census transform information for the first image and census transform information for a second image.

As another example, a non-transitory computer-readable medium is provided. The non-transitory computer-readable medium, when executed by a processor, causes the processor to: obtain a first image of an environment, the first image including a pattern of light; determine a pixel window for a pixel of the first image; determine a set of transform pixels based on the pattern of light, wherein the set of transform pixels are a subset of pixels from the pixel window; perform a census transform based on the pixel and the set of transform pixels to obtain census transform information for the first image; and generate depth data based on the census transform information for the first image and census transform information for a second image.

In another example, an apparatus for image processing is provided. The apparatus includes means for obtaining a first image of an environment, the first image including a pattern of light; means for determining a pixel window for a pixel of the first image; determining a set of transform pixels based on the pattern of light, wherein the set of transform pixels are a subset of pixels from the pixel window; means for performing a census transform based on the pixel and the set of transform pixels to obtain census transform information for the first image; and means for generating depth data based on the census transform information for the first image and census transform information for a second image.

Aspects generally include a method, apparatus, system, computer program product, non-transitory computer-readable medium, user equipment, base station, wireless communication device, and/or processing system as substantially described herein with reference to and as illustrated by the drawings and specification.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
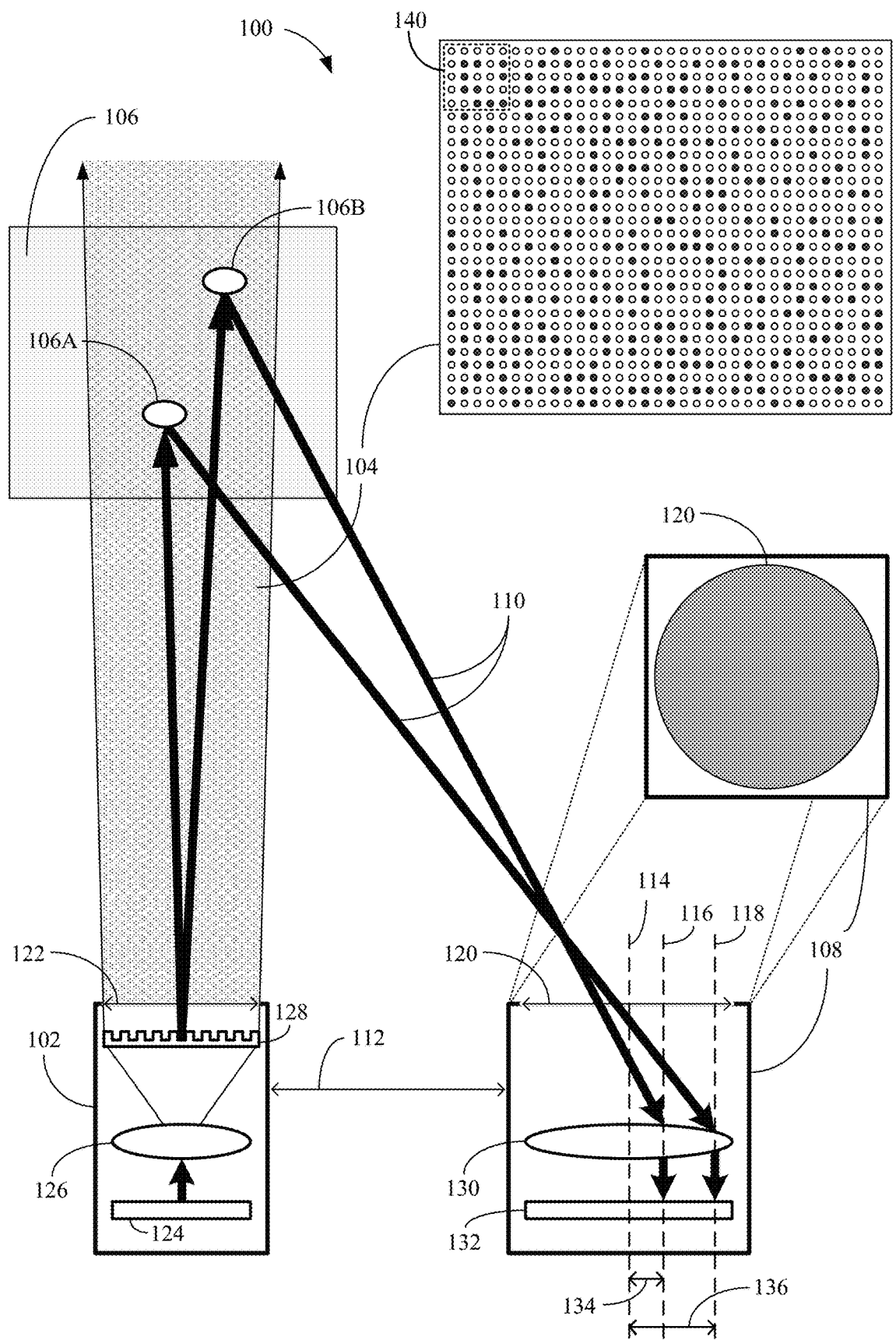
FIG. 1 is a block diagram illustrating an example active depth sensing system, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Various systems and/or applications make use of three-dimensional (3D) information representing a scene, such as systems and/or applications that perform face recognition, authentication systems that uses a subject's face identification (ID), object scanning, autonomous driving, robotics navigation and/or object detection, aviation navigation (e.g., for unmanned aerial vehicles, airplanes, among others), indoor navigation, augmented reality (AR), 3D scene understanding, object grasping, object tracking, among other tasks. Recent needs to capture 3D information from a scene (e.g., for face ID, object scanning, autonomous driving, AR applications, among others) have created a high demand for active depth sensing technologies. For example, depth information may be used for a variety of operations used by such systems and/or applications, such as for adjusting an image capture operation, path planning, scene understanding (object detection, recognition, tracking), mapping, and the like.

Projected light technology is one example that offers a reliable and high quality depth capture system. In general, a projected light system (e.g., structured light system) can include a light sensor or other device for scanning and/or determining the dimensions and/or movement of a scene and/or one or more objects (e.g., a person, a device, an animal, a vehicle, etc.) in the scene. The projected light system can also project a known shape or pattern of light onto the scene, the scene including the one or more objects, and can determine the dimensions and/or movement of the scene (e.g., the dimensions and/or movement of the one or more objects within the scene) based on measured or detected deformations of the shape or pattern.

In some cases, a projected light system can project a configurable pattern of light. The projected light system can include at least one transmitter and at least one receiver. A transmitter of the projected light system can project or transmit a distribution of light points onto a target object. The projected light can include a plurality of light points or other shapes, and in some cases can be focused into any suitable size and dimensions. For example, the light may be projected in lines, squares, or any other suitable shape and/or dimension. As noted above, a projected light system can act as a depth sensing system that can be used to generate a depth data for a scene.

In some implementations, the light pattern (e.g., the points of light) may be projected onto a scene, and the reflections of the points of light (along with other light) may be received by a receiver of the active depth sensing system. Depths of objects in a scene can be determined by comparing the pattern of the received light in captured images and the pattern of the transmitted light. For example, in comparing the patterns, a portion of the predefined distribution of the transmitted light may be identified in the received light. The locations of the portions and any skew or stretching of the portions of the distribution identified in the received light can be used to determine depths of one or more objects in the scene.

In some cases, processing captured images to perform depth sensing may be computationally and/or memory intensive. For example, stereo images may be captured and processed to generate depth data for the images. In some cases, the depth data may be in a form of a depth map for the images. This processing compares the stereo images and captured light patterns. For example, a census transform may be applied to the stereo images. The census transform may compare an intensity of a pixel with the intensity of neighboring pixels (e.g., transform pixels) within a window around the pixel and may output a value, such as a set of binary bits, which indicate whether the intensity of the pixel intensity is greater than or less than the intensities of the neighboring pixels. In some examples, values from the census transform may be compared for corresponding pixels in the stereo images to determine a Hamming distance as between the images. This comparison result (e.g., the distance) may be used to generate the depth data. In some cases, the census transform may generate 24 to 32 bits of information for each pixel of each image, in addition to the images themselves. Storing, transferring, and processing such large amounts of data may be resource intensive.

Methods (also referred to as processes), systems, apparatuses, and computer-readable media (collectively referred to as "systems and techniques") are described herein that provide a technique for stereo vision with a census transform. Improvements to projected light systems that perform a census transform may help reduce computational complexity and memory usage when processing captured stereo images for generating depth data by reducing a complexity of transforms that may be applied to images. For example, projected light systems may project a predictable light pattern into the environment. This light pattern may be in the form of a geometric pattern, such as a polygonal pattern. Thus, dots of the light pattern may be projected based on the geometric pattern. For example, the dots of the light pattern may be projected at vertices of the geometric pattern. In some cases, the geometric pattern may be a hexagonal pattern. As locations of where dots of the light pattern may be projected are known (e.g., based on the geometric pattern), the transform, such as a census transform, may be performed for those pixels of a captured image corresponding to where the dots of the light pattern may be projected. By performing the census transform for pixels of a captured image corresponding to where the dots of the light pattern may be projected, an amount of information generated for the census transform can be reduced, as compared to performing the census transform for all neighboring pixels.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

FIG. 1 is a depiction of an example active depth sensing system 100 configured to use a distribution of light for determining depths of objects 106A and 106B in a scene 106. The active depth sensing system 100 may be used to generate a depth data, such as a depth map (not pictured) of the scene 106. For example, the scene 106 may include an object (e.g., a face), and the active depth sensing system 100 may be used to generate depth data including a plurality of depth values indicating depths of portions of the object for identifying or authenticating the object (e.g., for face authentication). The active depth sensing system 100 includes a projector 102 and a receiver 108. The projector 102 may be referred to as a "projected light source," "structured light source," "transmitter," "emitter," "light source," or other similar term, and should not be limited to a specific transmission component. Throughout the following disclosure, the terms projector, transmitter, and light source may be used interchangeably. The receiver 108 may be referred to as a "detector," "sensor," "sensing element," "photodetector," and so on, and should not be limited to a specific receiving component.

The projector 102 may be configured to project or transmit a distribution 104 of light points onto the scene 106. The white circles in the distribution 104 indicate where no light is projected for a possible point location, and the black circles in the distribution 104 indicate where light is projected for a possible point location. The disclosure may refer to the distribution 104 as a codeword distribution or a pattern, where defined portions of the distribution 104 are codewords (also referred to as codes). As used herein, a codeword is a rectangular (such as a square) portion of the distribution 104 of light. For example, a 5×5 codeword 140 is illustrated in the distribution 104. As shown, the codeword 140 includes five rows of possible light points and five columns of possible light points. The distribution 104 may be configured to include an array of codewords. For active depth sensing, the codewords may be unique from one another in the distribution 104. For example, codeword 140 is different than all other codewords in the distribution 104. Further, the location of unique codewords with reference to one another is known. In this manner, one or more codewords in the distribution may be identified in reflections, and the location of the identified codewords with reference to one another, the shape or distortion of the identified codewords with reference to the shape of the transmitted codeword, and the location of the identified codeword on a receiver sensor are used to determine a depth of an object in the scene reflecting the codeword.

The projector 102 includes one or more light sources 124 (such as one or more lasers). In some implementations, the one or more light sources 124 includes a laser array. In one illustrative example, each laser may be a vertical cavity surface emitting laser (VCSel). In another illustrative example, each laser may include a distributed feedback (DFB) laser. In another illustrative example, the one or more light sources 124 may include a resonant cavity light emitting diodes (RC-LED) array. In some implementations, the projector may also include a lens 126 and a light modulator 128. The projector 102 may also include an aperture 122 from which the transmitted light escapes the projector 102. In some implementations, the projector 102 may further include a diffractive optical element (DOE) to diffract the emissions from one or more light sources 124 into additional emissions. In some aspects, the light modulator 128 (to adjust the intensity of the emission) may include a DOE. In projecting the distribution 104 of light points onto the scene 106, the projector 102 may transmit one or more lasers from the light source 124 through the lens 126 (and/or through a DOE or light modulator 128) and onto objects 106A and 106B in the scene 106. The projector 102 may be positioned on the same reference plane as the receiver 108, and the projector 102 and the receiver 108 may be separated by a distance called the baseline 112.

In some example implementations, the light projected by the projector 102 may be infrared (IR) light. IR light may include portions of the visible light spectrum and/or portions of the light spectrum that is not visible to the naked eye. In one example, IR light may include near infrared (NIR) light, which may or may not include light within the visible light spectrum, and/or IR light (such as far infrared (FIR) light) which is outside the visible light spectrum. The term IR light should not be limited to light having a specific wavelength in or near the wavelength range of IR light. Further, IR light is provided as an example emission from the projector. In the following description, other suitable wavelengths of light may be used. For example, light in portions of the visible light spectrum outside the IR light wavelength range or ultraviolet light may be used.

The scene 106 may include objects at different depths from the projected light system (such as from the projector 102 and the receiver 108). For example, objects 106A and 106B in the scene 106 may be at different depths. The receiver 108 may be configured to receive, from the scene 106, reflections 110 of the transmitted distribution 104 of light points. To receive the reflections 110, the receiver 108 may capture a frame. When capturing the frame, the receiver 108 may receive the reflections 110, as well as (i) other reflections of the distribution 104 of light points from other portions of the scene 106 at different depths and (ii) ambient light. Noise may also exist in the capture.

In some example implementations, the receiver 108 may include a lens 130 to focus or direct the received light (including the reflections 110 from the objects 106A and 106B) on to the sensor 132 of the receiver 108. The receiver 108 also may include an aperture 120. Assuming for the example that only the reflections 110 are received, depths of the objects 106A and 106B may be determined based on the baseline 112, displacement and distortion of the light distribution 104 (such as in codewords) in the reflections 110, and intensities of the reflections 110. For example, the distance 134 along the sensor 132 from location 116 to the center 114 may be used in determining a depth of the object 106B in the scene 106. Similarly, the distance 136 along the sensor 132 from location 118 to the center 114 may be used in determining a depth of the object 106A in the scene 106. The distance along the sensor 132 may be measured in terms of number of pixels of the sensor 132 or a unit of distance (such as millimeters).

In some example implementations, the sensor 132 may include an array of photodiodes (such as avalanche photodiodes) for capturing a frame. To capture the frame, each photodiode in the array may capture the light that hits the photodiode and may provide a value indicating the intensity of the light (a capture value). The frame therefore may be an array of capture values provided by the array of photodiodes.

In addition or alternative to the sensor 132 including an array of photodiodes, the sensor 132 may include a complementary metal-oxide semiconductor (CMOS) sensor. To capture the image by a photosensitive CMOS sensor, each pixel of the sensor may capture the light that hits the pixel and may provide a value indicating the intensity of the light. In some example implementations, an array of photodiodes may be coupled to the CMOS sensor. In this manner, the electrical impulses generated by the array of photodiodes may trigger the corresponding pixels of the CMOS sensor to provide capture values.

The sensor 132 may include at least a number of pixels equal to the number of possible light points in the distribution 104. For example, the array of photodiodes or the CMOS sensor may include at least a number of photodiodes or a number of pixels, respectively, corresponding to the number of possible light points in the distribution 104. The sensor 132 logically may be divided into groups of pixels or photodiodes that correspond to a size of a bit of a codeword (such as 4×4 groups for a 4×4 codeword). The group of pixels or photodiodes also may be referred to as a bit, and the portion of the captured data from a bit of the sensor 132 also may be referred to as a bit. In some example implementations, the sensor 132 may include at least the same number of bits as the distribution 104. If the light source 124 transmits IR light (such as NIR light at a wavelength of, e.g., 940 nanometers (nm)), the sensor 132 may be an IR sensor to receive the reflections of the NIR light.

As illustrated, the distance 134 (corresponding to the reflections 110 from the object 106B) is less than the distance 136 (corresponding to the reflections 110 from the object 106A). Using triangulation based on the baseline 112 and the distances 134 and 136, the differing depths of objects 106A and 106B in the scene 106 may be determined in generating depth data for the scene 106. In some cases, the depth data may be in the form of a depth map for the scene 106. Determining the depths may further be based on a displacement or a distortion of the distribution 104 in the reflections 110.

In some implementations, the projector 102 is configured to project a fixed light distribution, in which case the same distribution of light is used in every instance for active depth sensing. In some implementations, the projector 102 is configured to project a different distribution of light at different times. For example, the projector 102 may be configured to project a first distribution of light at a first time and project a second distribution of light at a second time. A resulting depth data of one or more objects in a scene is thus based on one or more reflections of the first distribution of light and one or more reflections of the second distribution of light. The codewords between the distributions of light may differ, and the active depth sensing system 100 may be able to identify a codeword in the second distribution of light corresponding to a position in the first distribution of light for which the codeword could not be identified. In this manner, more valid depth values may be generated in generating the depth data without reducing the resolution of the depth data (such as by increasing the size of the codewords).

Although a number of separate components are illustrated in FIG. 1, one or more of the components may be implemented together or include additional functionality. All described components may not be required for an active depth sensing system 100, or the functionality of components may be separated into separate components. Additional components not illustrated also may exist. For example, the receiver 108 may include a bandpass filter to allow signals having a determined range of wavelengths to pass onto the sensor 132 (thus filtering out signals with a wavelength outside of the range). In this manner, some incidental signals (such as ambient light) may be prevented from being received as interference during the captures by the sensor 132. The range of the bandpass filter may be centered at the transmission wavelength for the projector 102. For example, if the projector 102 is configured to transmit NIR light with a wavelength of 940 nm, the receiver 108 may include a bandpass filter configured to allow NIR light having wavelengths within a range of, e.g., 920 nm to 960 nm. Therefore, the examples described regarding FIG. 1 is for illustrative purposes.

Figure 2:
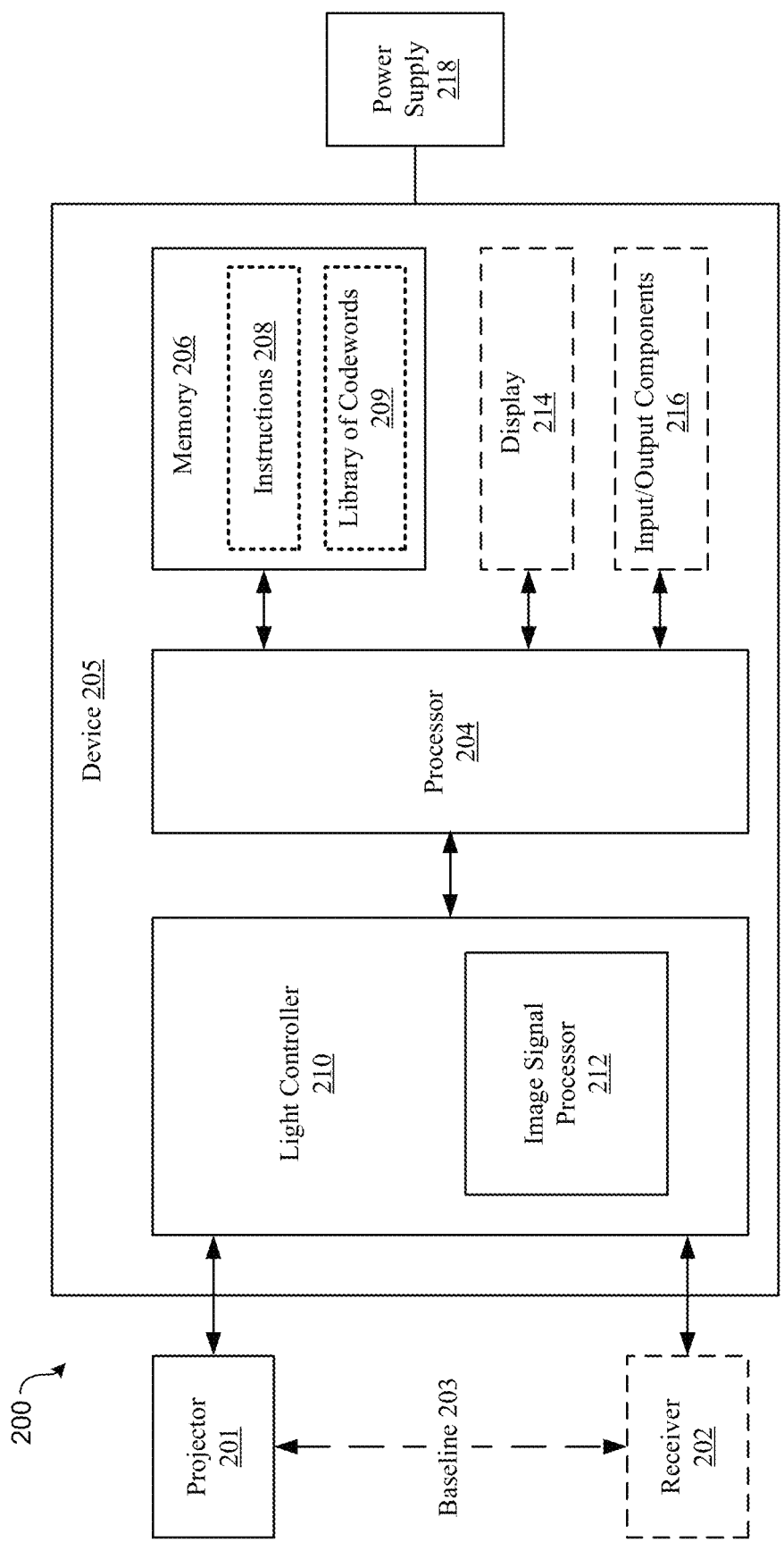
FIG. 2 is a block diagram illustrating another example of a system configured to emit different distributions of light for active depth sensing, in accordance with some examples.

FIG. 2 is a block diagram illustrating an example of a system 200 including a device 205 and a projector 201 configured to emit different distributions of light for active depth sensing. In some examples, the projector 201 can be part of the device 205. In some other examples, a transmitter may be separate from and coupled to the device 205. The example device 205 may include or be coupled to a projector 201 and a receiver 202 separated from the projector 201 by a baseline 203. The receiver 202 may be an IR sensor configured to capture frames, and the projector 201 may be a projector configured to project two or more different distributions of light. The receiver 202 can be part of the device 205, or can be separate from and coupled to the device 205.

The example device 205 also may include a processor 204, a memory 206 storing instructions 208, and a light controller 210 (which may include one or more image signal processors 212). The device 205 may optionally include (or be coupled to) a display 214 and a number of input/output (I/O) components 216. The device 205 may include additional features or components not shown. For example, a wireless interface, which may include a number of transceivers and a baseband processor, may be included for a wireless communication device to perform wireless communications. In another example, the device 205 may include one or more cameras (such as a contact image sensor (CIS) camera or other suitable camera for capturing images using visible light). The projector 201 and the receiver 202 may be part of an active depth sensing system (such as the system 100 in FIG. 1) controlled by the light controller 210 and/or the processor 204. The device 205 may include or be coupled to additional light projectors (or a flood illuminator) or may include a different configuration for the light projectors. The device 205 also may include or be coupled to additional receivers (not shown) for capturing multiple frames of a scene. The disclosure is not to be limited to any specific examples or illustrations, including the example device 205.

The memory 206 may be a non-transient or non-transitory computer readable medium storing computer-executable instructions 208 to perform all or a portion of one or more operations described in this disclosure. If the light distribution projected by the projector 201 is divided into codewords, the memory 206 optionally may store a library of codewords 209 for the distribution of light including the plurality of codewords in the library of codewords 209. The library of codewords 209 may indicate what codewords exist in the distribution and the relative location between the codewords in the distribution. The device 205 may use the library of codewords 209 to identify codewords in one or more reflections within captures from the receiver 202. The device 205 also may include a power supply 218, which may be coupled to or integrated into the device 205.

The processor 204 may be one or more suitable processors capable of executing scripts or instructions of one or more software programs (such as instructions 208 stored within the memory 206). In some aspects, the processor 204 may be one or more general purpose processors that execute instructions 208 to cause the device 205 to perform any number of functions or operations. In additional or alternative aspects, the processor 204 may include integrated circuits or other hardware to perform functions or operations without the use of software. In some implementations, the processor 204 includes one or more application processors to execute applications stored in executable instructions 208. For example, if the device 205 is a smartphone or other computing device, the processor 204 may execute instructions for an operating system of the device 205, and the processor 204 may provide instructions to the light controller 210 for controlling the active depth sensing system.

While shown to be coupled to each other via the processor 204 in the example of FIG. 2, the processor 204, the memory 206, the light controller 210, the optional display 214, and the optional I/O components 216 may be coupled to one another in various arrangements. For example, the processor 204, the memory 206, the light controller 210, the optional display 214, and/or the optional I/O components 216 may be coupled to each other via one or more local buses (not shown for simplicity).

The display 214 may be any suitable display or screen allowing for user interaction and/or to present items (such as a depth data, a preview image of a scene, a lock screen, etc.) for viewing by a user. In some aspects, the display 214 may be a touch-sensitive display. The I/O components 216 may be or include any suitable mechanism, interface, or device to receive input (such as commands) from the user and to provide output to the user. For example, the I/O components 216 may include (but are not limited to) a graphical user interface, keyboard, mouse, microphone and speakers, squeezable bezel or border of the device 205, physical buttons located on device 205, and so on. The display 214 and/or the I/O components 216 may provide a preview image or depth data of the scene to a user and/or receive a user input for adjusting one or more settings of the device 205.

The light controller 210 may include a signal processor 212, which may be one or more processors to configure the projector 201 and process frames captured by the receiver 202. In some aspects, the image signal processor 212 may execute instructions from a memory (such as instructions 208 from the memory 206 or instructions stored in a separate memory coupled to the image signal processor 212). In other aspects, the image signal processor 212 may include specific hardware for operation. The image signal processor 212 may alternatively or additionally include a combination of specific hardware and the ability to execute software instructions.

In some implementations, the processor 204 may be configured to provide instructions to the image signal processor 212. The instructions may be executed by the image signal processor 212 to configure filters or other components of an image processing pipeline for processing frames from the receiver 202. The instructions may also be executed by the image signal processor 212 to configure the projector 201 for projecting one or more distributions of light for active depth sensing. While the following aspects of the disclosure may be described in relation to the device 205, any suitable device or configuration of device components may be used for performing aspects of the disclosure, and the present disclosure is not limited by a specific device configuration.

Figure 3:
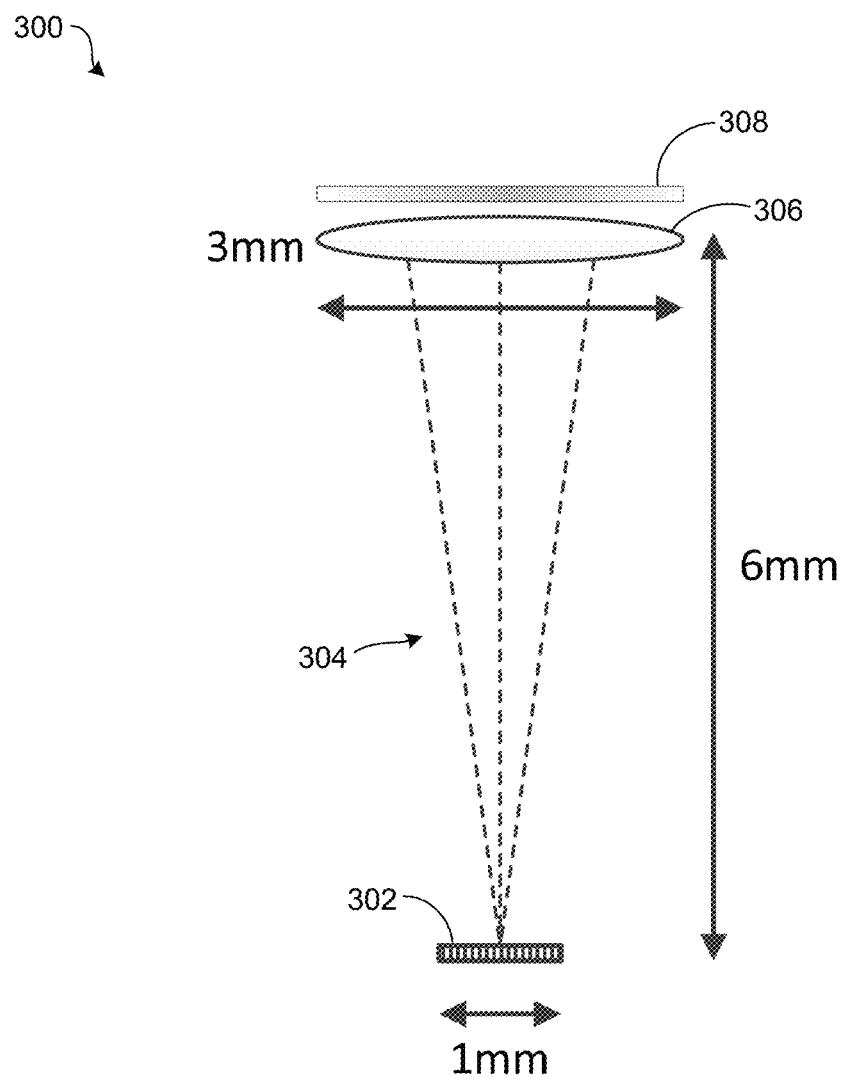
FIG. 3 illustrates an example of a simplified structured light system, in accordance with some examples.

FIG. 3 illustrates an example of a simplified projected light system 300. In some cases, the system 300 can include a transmitter that is part of a larger projected light system or device. In some cases, the projected light system 300 can be implemented as part of the system 100 or the system 200. In some implementations, the system 300 can be used for depth sensing to generate depth data for various applications, such as in 3D imaging for object recognition (e.g., face recognition etc.), autonomous driving systems (e.g., for navigation or other task), gesture recognition, robotics systems, aviation systems, among others. The system 300 includes an array 302 of light emitting sources (also referred to as light emitters). The array 302 can also be referred to as a projected light source. In some cases, the array 302 can include multiple arrays. In some examples, the array 302 of light emitting sources can include a surface-emitting array of light emitters (e.g., a VCSel array or other suitable array) that generates optical beams of light 304 from a surface of a device or component (e.g., a substrate or wafer) of a device. While the array 302 illustrated in FIG. 3 is shown having a length of 1 mm as an illustrative example, one of ordinary skill will appreciate that the array 302 can include any other suitable length (e.g., 0.5 mm, 1.5 mm, 2 mm, or other length).

In some cases, the array 302 (e.g., as a surface-emitting array) can be an addressable array, in which individual elements of the array (or in some cases groups of elements in the array) are independently electrically controlled. For example, a light emitting source of the surface-emitting array can be connected to a photodiode (e.g., through a fiber connection or other connection). A pulse voltage can be applied to a base of a transistor (e.g., a bipolar junction transistor), causing a laser current to pulsate and the light emitting source to have a corresponding output power. An example of an addressable surface-emitting array is a VCSel array, a resonant cavity light emitting diodes (RC-LED) array, among others.

The optical beams of light 304 generated and transmitted by the array 302 of light emitting sources can be projected in one or more spatial patterns onto a surface of an object or other surface. The spatial pattern can include any type of pattern, such as a pattern that includes spots or dots, stripes, fringe, squares, and/or another other shape. The spatial patterns may be regular (e.g., with a fixed pattern of shapes) or irregular (e.g., with a non-fixed pattern of shapes). The spatial pattern can be provided in one or two dimensions.

In some examples, the array 302 of light emitting sources can provide the desired primitive pattern (e.g., with enough points to disambiguate depth). For instance, the configuration of light emitting sources in the array 302 can be used to define the primitive pattern. In some examples, the primitive pattern can be defined by a pattern diffractive optical element (DOE), not shown in FIG. 3. The beams of emitted light from the array 302 (or from the pattern DOE in examples where a pattern DOE is used to define the pattern) can be collimated (or aligned) with a lens 306. The longer the focal length of the lens, the higher the resolution of the projected pattern.

A primitive pattern can include a plurality of spatially-coded and unique codes within a certain symbol structure (an n1-by-n2 symbol structure). A primitive pattern can be defined from a subset of all possible codes (e.g., combinations of symbols that are possible within the symbol structure). An example of a 24×34 primitive pattern is the primitive pattern 402 shown in FIG. 4A and FIG. 4B. As described in more detail below, the primitive pattern be used to generate a pattern. The array 302 can have a regular grid (e.g., a square grid, a hexagonal grid, or a grid having another shape) of light emitting sources that are used to generate the codes. In some cases, a certain number of potential points on the grid can be activated (or turned on). In one illustrative example, a mask pattern can be generated using a regular grid to generate the codes of a pattern by turning on approximately 52% of the potential points of the grid. In some examples, the mask pattern (e.g., the activated light emitting sources) does not change temporally and is temporally fixed. Multiple points from the grid form a code. In one illustrative example, a 4×4 group of points (16 points total) can form a code. As noted above, in some cases, not all points (e.g., not all 16 points from the example above) will be turned on or activated, in which case multiple codes (or primitives) can be formed within the mask with strict properties.

In some cases, as shown in FIG. 3, a single lens 306 can be used to collimate or align the light beams from the array 302 of light emitting sources. In some cases, a separate microlens can be provided for each light emitting source. In such cases, each microlens can be used to collimate a light beam from a respective light emitting source (e.g., a first microlens for collimating a first light beam from a first light emitting source of the array 302, a second microlens for collimating a second light beam from a second light emitting source of the array 302, and so on). Collimation of the light beams from the array 302 can increase the effective brightness of the light, can reduce divergence of the light beam, can eliminate or reduce blur (or astigmatism), can improve wavefront quality, can make the beam less elliptical, and can focus the light beams (e.g., to focus the light beams onto the tessellation DOE 308 described below).

In some examples, a primitive pattern can be periodic. For example, the code primitive may be replicated or repeated one or more times in one or more directions (e.g., horizontally and/or vertically) to fill the transmitter FOV (e.g., the FOV of the system 310). In some examples, a tessellation DOE 308 can be used to tessellate (or replicate) the primitive pattern projected by the array 302 of light emitting sources. The tessellation DOE 308 can have a template designed to generate and emit multiple replicas of the pattern by generating multiple copies of the primitive pattern in a side-by-side manner (e.g., with the primitive pattern being repeated horizontally and/or vertically).

Figure 4A:
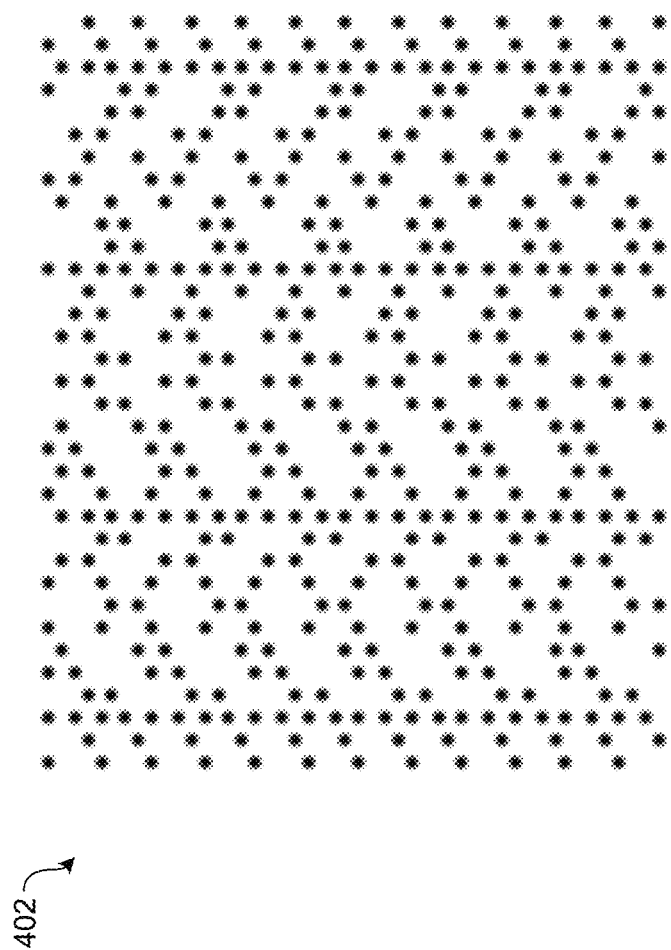
FIG. 4A is a diagram illustrating an example of a primitive pattern, in accordance with some examples.
Figure 4B:
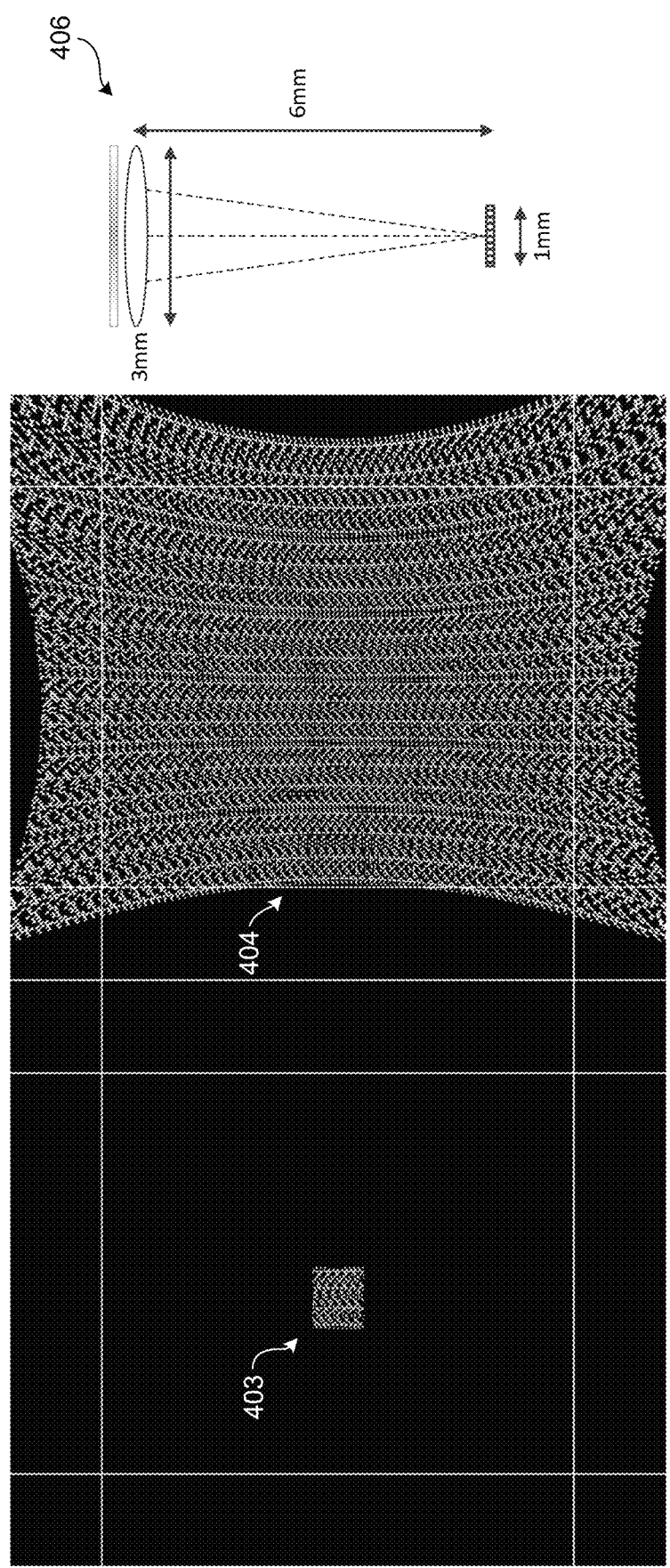
FIG. 4B is a diagram illustrating an example of a projected pattern and a tessellated pattern of light, in accordance with some examples.

FIG. 4A is a diagram illustrating an example of a 24×36 primitive pattern 402 of light generated by the array 302 of light emitting sources and collimated using the lens 306. The primitive pattern 402 (the desired primitive) is what the system 300 desires to have at the output of the transmitter. The black dots represent points of light. FIG. 4B is a diagram illustrating a projected pattern 403 of light (e.g., projected using the transmitter shown in FIG. 3). The projected pattern 403 has the same pattern as the primitive pattern 402. The points of the projected pattern 403 are more spread out as compared to the points shown in the primitive pattern 402 due to the focal length of the transmitter. For example, as noted above, a longer focal length of the lens results in a higher resolution of the projected pattern (with the points being closer together).

FIG. 4B also illustrates a tessellated pattern 404 of light. The tessellated pattern 404 of light is generated by the tessellation DOE 308 replicating the projected pattern 403 of light (e.g., in order to fill in the transmitter field of view (FOV), such as the FOV of the system 300). For example, the center of the tessellated pattern 404 of light is the same as the projected pattern 403 of light, with the projected pattern 403 being replicated to the left, right, above, and below the center.

In some cases, images of the scene, including the tessellated pattern 404 may be captured. The received image can be analyzed to determine depth information of the object or scene. For instance, the captured image of the scene or object can be decoded to obtain depth data for the scene or object. In some cases, a section of the projected pattern 403 is projected onto the surface of an object or scene, and the projected section may then be captured by the receiver as a captured segment (e.g., pixel window). Based on the images captured by the receiver, multiple segments may be identified over the scene or object. The receiver may uniquely identify each segment and can determine the location of each segment relative to other segments from the known pattern. In some cases, a code from each segment can be determined using pattern segmentation (e.g., to address distortion) by decoding of the perceived segment into one or more corresponding codes. For example, the receiver may select a captured segment (e.g., pixel window) and based on a location of the captured segment, relative to the captured image, the receiver may expect a certain portion of the projected pattern to be visible in the captured segment. The receiver may then look for the expected portion of the projected pattern in the captured segment. In some examples, triangulation may be applied over each captured segment to determine an orientation and/or depth. Multiple segments can be combined to stitch together a captured image pattern in order to generate depth data.

As indicated above, processing the captured images to generate the depth data can be memory and/or computationally intensive. For example, each census transform for a full dot pattern area may use a megabyte or more of memory. Thus, techniques to reduce the amount of memory and/or computation used for processing the captured images may be useful. In some cases, a dot pattern that allows for projected stereo with a census transform to be applied may help reduce computational complexity and memory usage when processing captured stereo images for generating depth data.

Figure 5A:
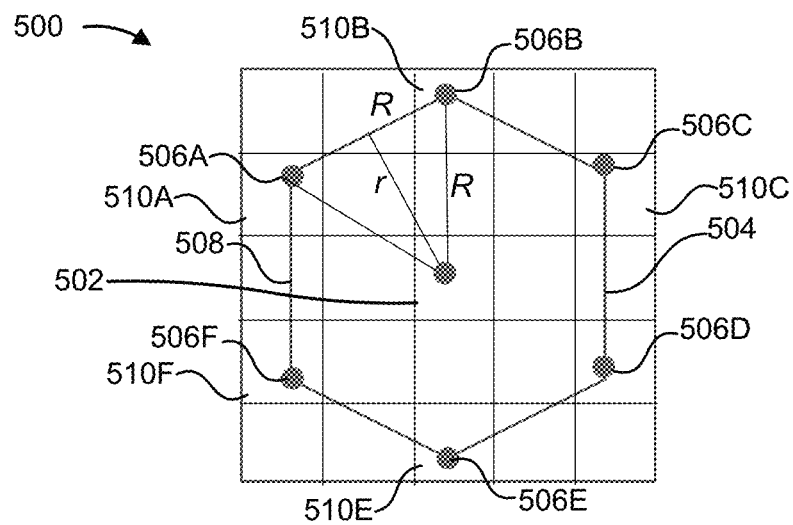
FIG. 5A illustrates a 5×5 pixel window 500 that may be used for a census transform, in accordance with aspects of the present disclosure.

FIG. 5A illustrates a 5×5 pixel window 500 that may be used for a census transform, in accordance with aspects of the present disclosure. In some cases, the census transform may be performed for each pixel of an image. For example, a pixel of an image may be selected and a pixel window around the pixel may be determined. The census transform may be performed for the pixel based on neighboring pixels in the pixel window. Information from the census transform indicates, for the selected pixel (e.g., a center pixel of the pixel window), whether the selected pixel has a higher intensity or lower intensity than neighboring pixels within the pixel window. The census transform may be performed for pixels of a set of stereo images. This intensity information may be used to help correlate pixels of the stereo images based on a location and intensity differences of the pixels.

In some examples, the census transform may be performed based on a pixel window (e.g., 3×3, 5×5, etc. window), such as the 5×5 pixel window 500 in this example. In some cases, the pixel window 500 may be selected based on a dot pattern, such as primitive pattern 402 of FIG. 4A, being used. The census transform, for a pixel window, indicates a relationship between a center pixel 502 in a center of the pixel window 500 to the other pixels (e.g., transform pixels) of the window 500. In some cases, the transform pixels may be the neighboring pixels that the census transform is performed on. The census transform may output a vector that encodes the differences between the center pixel 502 and the other pixels. In the case of a random (e.g., fully random or pseudo random) dot pattern, the census transform will be determined for each pixel of the pixel window, as compared to the center pixel 502, resulting in a 24×1 (e.g., 25−1) binary vector. The census transform may be performed for each pixel of the pixel window because it is not known in which pixel window the dots of the dot pattern will appear. In some cases, if the binary vector of the census transform is stored in as a 32 bit depth number, then the memory footprint of the census transform would be a function of a height of the image x width of the image x 32 bit, which may be substantial, especially as image resolutions increase. The census transform may be described as a function $$\xi(p, p') = \begin{cases} 0 & \text{if } p > p' \\ 1 & \text{if } p \leq p' \end{cases}.$$

Of note, while discussed in the context of a census transform, it should be understood that the techniques discussed herein are applicable to other transforms as well.

Figure 5B:
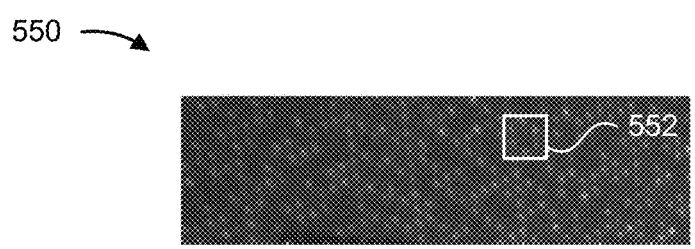
FIG. 5B illustrates a tessellated pattern, in accordance with aspects of the present disclosure.

In some cases, projected stereo may use a specially designed pattern. As an example, as shown in FIG. 5A, a hexagonal pattern 504 may be used. In a hexagonal pattern, dots of the light pattern are arranged such that the dots may appear on vertices 506A, 506B, 506C, 506D, 506E, and 506F (collectively vertices 506) of a hexagon shape 508 around the center pixel 502. For example, the hexagonal pattern 504 appearing in pixel window 500 may be a portion 552 of a tessellated pattern 550 shown in FIG. 5B. This hexagonal pattern may be based on which vertices 506 of the hexagonal pattern 504 include dots of the light pattern. Thus, not all vertices 506 may include a dot in the light pattern. For example, while in pixel window 500, dots of the light pattern appear in each of the vertices 506, in another pixel window, the light pattern may only include dots in vertices 506B, 506D, and 506F. In some cases, the dots of the light pattern may differ for adjacent pixel windows. This difference may help allow the depth sensing system to determine which portion of the tessellated pattern is being analyzed.

In some cases, the census transform may be performed on a set of transform pixels. The set of transform pixels are a subset of neighboring pixels in the pixel window, such as pixel window 500. Pixels of the set of transform pixels may correspond to pixels of the pixel window in which dots of the light pattern can be expected to appear (e.g., based on vertices of the light pattern). As the dots of the light pattern can be expected to appear in pixels corresponding to the vertices 506, the depth sensing system may perform the census transform for those pixels corresponding to the expected locations of the vertices 506, rather than performing the census transform for all of the pixels. For example, the census transform may be performed between the center pixel 502 and transform pixels 510A-510F and the center pixel 502 rather than between the center pixel 502 and all of the other pixels in the pixel window 500. In some cases, the census transform for a 5×5 pixel window, such as pixel window 500 with a hexagonal pattern, may be described by the functions $$r = \frac{\sqrt{3}}{2} R \text{ and } (x, y) = R\left(\frac{1}{2}, \frac{\sqrt{3}}{2}\right),$$

where R may be a distance of sides of a triangle formed between the center pixel 502 and two adjacent vertices (such as vertices 506A and 506B) of the hexagonal pattern 504, and r may be the distance of the median of the triangle. While a dot of the light pattern may not be present in each pixel of the pixel window correlating to a vertex of the hexagonal pattern 504, the census transform may be performed for each pixel of the pixel window correlating to a vertex of the hexagonal pattern 504. As the census transform may be performed for the six transform pixels 510A-510F corresponding to the vertices 506 of the hexagon shape 508, the binary vector output may be a 6×1 binary vector (e.g., census transform information, census transform output). Thus, as the structure of the light pattern is known a priori (e.g., the hexagonal pattern 504), a structure of the vector (e.g., as a 6×1 binary vector) may be designed based on the light pattern and different light patterns may be associated with different output census transform vectors. In some cases, while a dot of the light pattern may not be present in each pixel of the pixel window correlating to a vertex of the hexagonal pattern 504, the more dots that are present can help increase a signal to noise ratio for detecting varying depth across an area. Thus, in some cases, the primitive pattern 402 may be designed to include a minimum number of dots for an area (e.g., pixel window).

Figure 6:
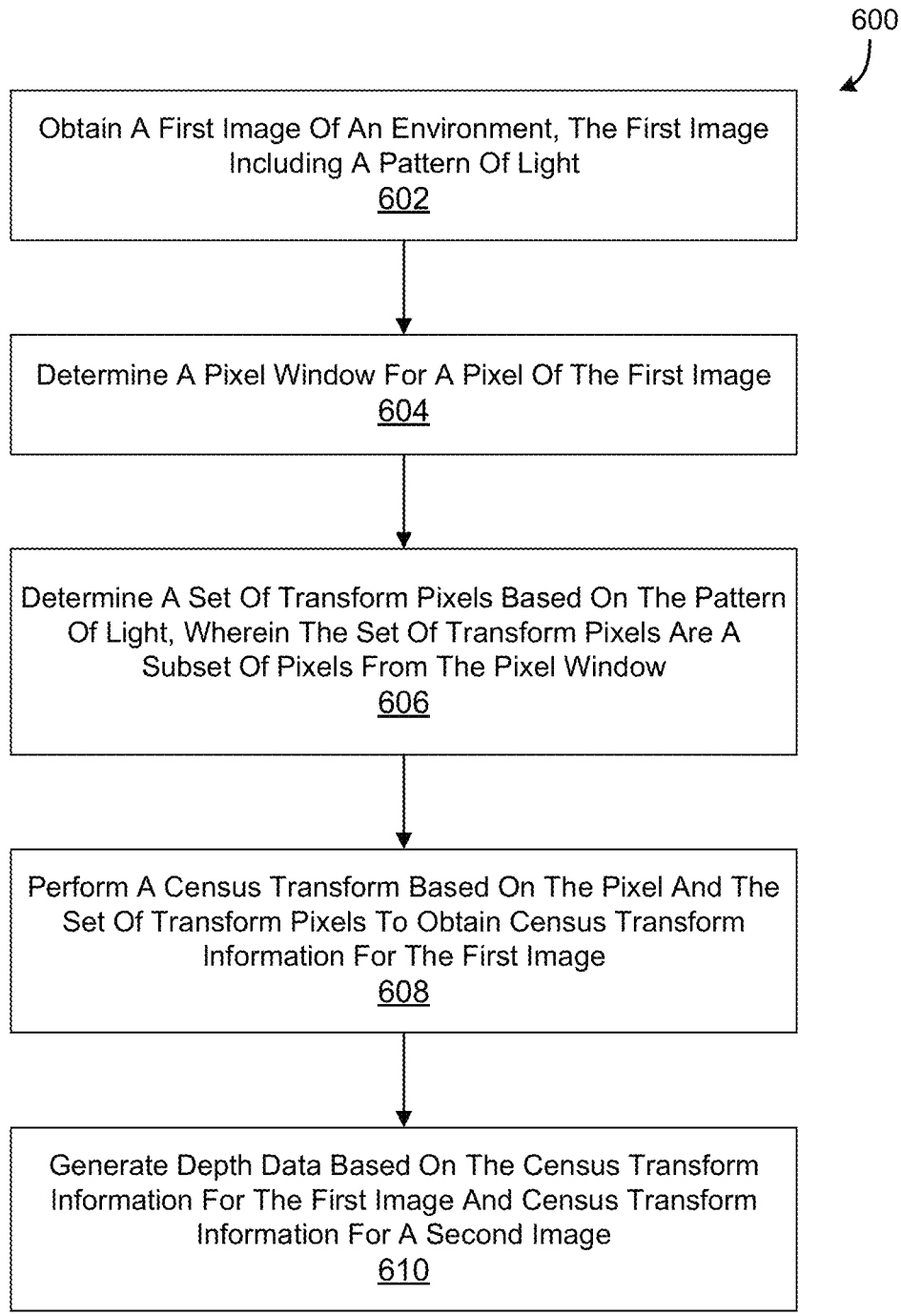
FIG. 6 is a flow diagram illustrating a process for generating depth information, in accordance with some examples.

FIG. 6 is a flow diagram illustrating a process 600 for generating depth information, in accordance with aspects of the present disclosure. The process 600 may be performed by a computing device (or apparatus) or a component (e.g., a chipset, codec, etc., such as image signal processor 212 and/or processor 204 of FIG. 2, processor 710 of FIG. 7, etc.) of the computing device (e.g., device 205, computing system 700, etc.). The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 600 may be implemented as software components (e.g., instructions 208) that are executed and run on one or more processors (image signal processor 212 and/or processor 204 of FIG. 2, processor 710 of FIG. 7, etc.).

At block 602, the computing device (or component thereof) may obtain a first image of the environment (e.g., from a camera, such as receiver 108 of FIG. 1, receiver 202 of FIG. 2, input device 745 of FIG. 7, etc.), the first image including the pattern of light (e.g., primitive pattern 402 of FIG. 4A, projected pattern 403 of FIG. 4B, tessellated pattern 404 of FIG. 4B, tessellated pattern 550 of FIG. 5, etc.). In some cases, the set of transform pixels correspond to the vertices of the polygonal pattern. In some cases, the dots of light appear at a subset of all of the vertices of the polygonal pattern. In some cases, the polygonal pattern comprises a hexagonal pattern. In some cases, the computing device comprises a mobile device.

At block 604, the computing device (or component thereof) may determine a pixel window (e.g., pixel window 500 of FIG. 5) for a pixel (e.g., center pixel 502 of FIG. 5) of the first image.

At block 606, the computing device (or component thereof) may determine a set of transform pixels (e.g., transform pixels 510 of FIG. 5) based on the pattern of light, wherein the set of transform pixels are a subset of pixels from the pixel window. In some cases, the pattern of light is in a polygonal pattern. In some cases, dots of light of the pattern of light appear in portions of the polygonal pattern for the pixel window. In some cases, the dots of light appear at vertices of the polygonal pattern. In some cases, the pixel window is five pixels in height and five pixels in width.

At block 608, the computing device (or component thereof) may perform a census transform based on the pixel and the set of transform pixels to obtain census transform information for the first image. In some cases, an output of the census transform comprises a vector. In some cases, a structure of the vector is based on the pattern of light.

At block 610, the computing device (or component thereof) may generate depth data based on the census transform information for the first image and census transform information for a second image. In some cases, the depth data comprises a depth map.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 600 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, process 600 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
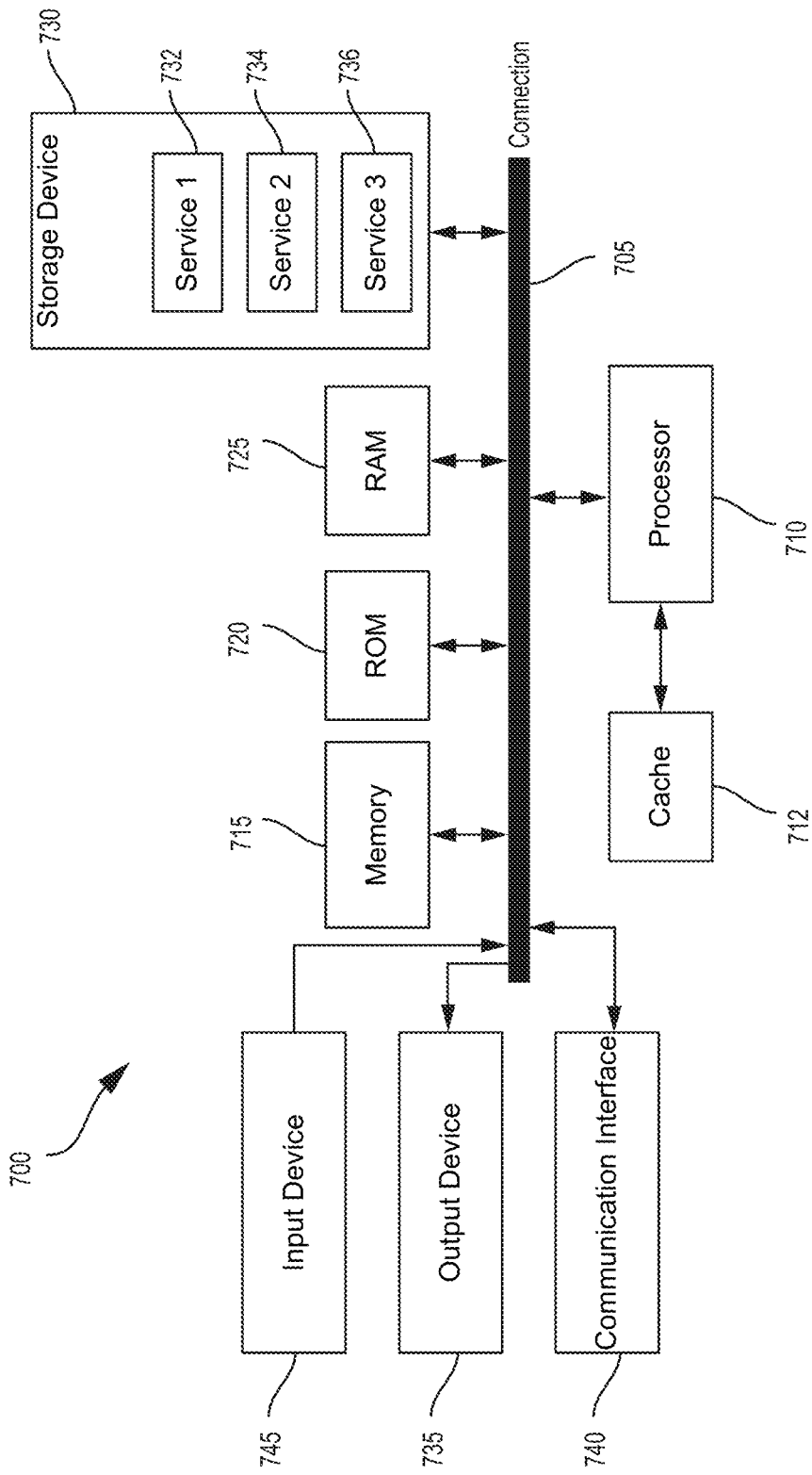
FIG. 7 is a block diagram illustrating an example of a computing system, in accordance with some examples.

FIG. 7 is a diagram illustrating an example of a system for implementing certain aspects of the present technology. In particular, FIG. 7 illustrates an example of computing system 700, which may be for example any computing device making up internal computing system, a remote computing system, a camera, or any component thereof in which the components of the system are in communication with each other using connection 705. Connection 705 may be a physical connection using a bus, or a direct connection into processor 710, such as in a chipset architecture. Connection 705 may also be a virtual connection, networked connection, or logical connection.

In some aspects, computing system 700 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 700 includes at least one processing unit (CPU or processor) 710 and connection 705 that communicatively couples various system components including system memory 725, such as read-only memory (ROM) 720 and random access memory (RAM) 725 to processor 710. Computing system 700 may include a cache 715 of high-speed memory connected directly with, in close proximity to, or integrated as part of processor 710.

Processor 710 may include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which may represent any number of input mechanisms, such as a microphone for speech, a touch-sensitive screen for gesture or graphical input, keyboard, mouse, motion input, speech, etc. Computing system 700 may also include output device 735, which may be one or more of a number of output mechanisms. In some instances, multimodal systems may enable a user to provide multiple types of input/output to communicate with computing system 700.

Computing system 700 may include communications interface 740, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug. 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/RcRAM), phase change memory (PCM), spin transfer torque RAM (STT-RAM), another memory chip or cartridge, and/or a combination thereof.

The storage device 730 may include software services, servers, services, etc., that when the code that defines such software is executed by the processor 710, it causes the system to perform a function. In some aspects, a hardware service that performs a particular function may include the software component stored in a computer-readable medium in connection with the necessary hardware components, such as processor 710, connection 705, output device 735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices. e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A device for image processing, comprising: at least one memory; a light source configured to project a pattern of light into an environment; and at least one processor coupled to the at least one memory, the at least one processor configured to: obtain a first image of the environment, the first image including the pattern of light; determine a pixel window for a pixel of the first image; determine a set of transform pixels based on the pattern of light, wherein the set of transform pixels are a subset of pixels from the pixel window; perform a census transform based on the pixel and the set of transform pixels to obtain census transform information for the first image; and generate depth data based on the census transform information for the first image and census transform information for a second image.

Aspect 2. The device of Aspect 1, wherein the pattern of light is in a polygonal pattern.

Aspect 3. The device of Aspect 2, wherein dots of light of the pattern of light appear in portions of the polygonal pattern for the pixel window.

Aspect 4. The device of Aspect 3, wherein the dots of light appear at vertices of the polygonal pattern.

Aspect 5. The device of Aspect 4, wherein the set of transform pixels correspond to the vertices of the polygonal pattern.

Aspect 6. The device of any one of Aspects 4 or 5, wherein the dots of light appear at a subset of all of the vertices of the polygonal pattern.

Aspect 7. The device of any one of Aspects 2 to 6, wherein the polygonal pattern comprises a hexagonal pattern.

Aspect 8. The device of any one of Aspects 1 to 7, wherein an output of the census transform comprises a vector.

Aspect 9. The device of Aspect 8, wherein a structure of the vector is based on the pattern of light.

Aspect 10. The device of any one of Aspects 1 to 9, wherein the device comprises a mobile device.

Aspect 11. The device of any one of Aspects 1 to 10, wherein the depth data comprises a depth map.

Aspect 12. The device of any one of Aspects 1 to 11, wherein the pixel window is five pixels in height and five pixels in width.

Aspect 13. A method for image processing, comprising: obtaining a first image of an environment, the first image including a pattern of light; determining a pixel window for a pixel of the first image; determining a set of transform pixels based on the pattern of light, wherein the set of transform pixels are a subset of pixels from the pixel window; performing a census transform based on the pixel and the set of transform pixels to obtain census transform information for the first image; and generating depth data based on the census transform information for the first image and census transform information for a second image.

Aspect 14. The method of Aspect 13, wherein the pattern of light is in a polygonal pattern.

23

Aspect 15. The method of Aspect 14, wherein dots of light of the pattern of light appear in portions of the polygonal pattern for the pixel window.

Aspect 16. The method of Aspect 15, wherein the dots of light appear at vertices of the polygonal pattern.

Aspect 17. The method of Aspect 16, wherein the set of transform pixels correspond to the vertices of the polygonal pattern.

Aspect 18. The method of any one of Aspects 16 or 17, wherein the dots of light appear at a subset of all of the vertices of the polygonal pattern.

Aspect 19. The method of any one of Aspects 14 to 18, wherein the polygonal pattern comprises a hexagonal pattern.

Aspect 20. The method of any one of Aspects 13 to 19, wherein an output of the census transform comprises a vector.

Aspect 21. The method of Aspect 20, wherein a structure of the vector is based on the pattern of light.

Aspect 22. The method of any one of Aspects 13 to 21, wherein the depth data comprises a depth map.

Aspect 23. The method of any one of Aspects 13 to 22, wherein the pixel window is five pixels in height and five pixels in width.

Aspect 24. A non-transitory computer-readable medium having stored thereon instructions that, when executed by a processor, causes the processor to: obtain a first image of an environment, the first image including a pattern of light; determine a pixel window for a pixel of the first image; determine a set of transform pixels based on the pattern of light, wherein the set of transform pixels are a subset of pixels from the pixel window; perform a census transform based on the pixel and the set of transform pixels to obtain census transform information for the first image; and generate depth data based on the census transform information for the first image and census transform information for a second image.

Aspect 25. The non-transitory computer-readable medium of Aspect 24, wherein the pattern of light is in a polygonal pattern.

Aspect 26. The non-transitory computer-readable medium of Aspect 25, wherein dots of light of the pattern of light appear in portions of the polygonal pattern for the pixel window.

Aspect 27. The non-transitory computer-readable medium of Aspect 26, wherein the dots of light appear at vertices of the polygonal pattern.

Aspect 28. The non-transitory computer-readable medium of Aspect 27, wherein the set of transform pixels correspond to the vertices of the polygonal pattern.

Aspect 29. The non-transitory computer-readable medium of any one of Aspects 27 or 28, wherein the dots of light appear at a subset of all of the vertices of the polygonal pattern.

Aspect 30. The non-transitory computer-readable medium of any one of Aspects 25 to 29, wherein the polygonal pattern comprises a hexagonal pattern.

Aspect 31. The non-transitory computer-readable medium of any one of Aspects 24 to 30, wherein an output of the census transform comprises a vector.

Aspect 32. The non-transitory computer-readable medium of Aspect 31, wherein a structure of the vector is based on the pattern of light.

Aspect 33. The non-transitory computer-readable medium of any one of Aspects 24 to 32, wherein the depth data comprises a depth map.

24

Aspect 34. The non-transitory computer-readable medium of any one of Aspects 24 to 33, wherein the pixel window is five pixels in height and five pixels in width.

Aspect 35. An apparatus for image processing, comprising one or more means for performing operations according to any of Aspects 13 to 23.

What is claimed is:

1. A device for image processing, comprising:
   at least one memory;
   a light source configured to project a pattern of light into an environment; and
   at least one processor coupled to the at least one memory, the at least one processor configured to:
     obtain a first image of the environment, the first image including the pattern of light, wherein the first image is captured by a camera;
     determine a pixel window for a pixel of the first image, the pixel window comprising a set of pixels around the pixel;
     determine a set of transform pixels based on the pattern of light projected by the light source, wherein the set of transform pixels are a subset of pixels from the pixel window;
     perform a census transform based on the pixel and the set of transform pixels to obtain census transform information for the first image; and
     generate depth data based on the census transform information for the first image.

2. The device of claim 1, wherein the pattern of light is in a polygonal pattern.

3. The device of claim 2, wherein dots of light of the pattern of light appear in portions of the polygonal pattern for the pixel window.

4. The device of claim 3, wherein the dots of light appear at vertices of the polygonal pattern.

5. The device of claim 4, wherein the set of transform pixels correspond to the vertices of the polygonal pattern.

6. The device of claim 4, wherein the dots of light appear at a subset of all of the vertices of the polygonal pattern.

7. The device of claim 2, wherein the polygonal pattern comprises a hexagonal pattern.

8. The device of claim 1, wherein an output of the census transform comprises a vector.

9. The device of claim 8, wherein a structure of the vector is based on the pattern of light.

10. The device of claim 1, wherein the device comprises a mobile device.

11. The device of claim 1, wherein the depth data comprises a depth map.

12. A method for image processing, comprising:
    obtaining a first image of an environment, the first image including a pattern of light projected by a light source, wherein the first image is captured by a camera;
    determining a pixel window for a pixel of the first image, the pixel window comprising a set of pixels around the pixel;
    determining a set of transform pixels based on the pattern of light projected by the light source, wherein the set of transform pixels are a subset of pixels from the pixel window;
    performing a census transform based on the pixel and the set of transform pixels to obtain census transform information for the first image; and
    generating depth data based on the census transform information for the first image.

13. The method of claim 12, wherein the pattern of light is in a polygonal pattern.

14. The method of claim 13, wherein dots of light of the pattern of light appear in portions of the polygonal pattern for the pixel window.

15. The method of claim 14, wherein the dots of light appear at vertices of the polygonal pattern.

16. The method of claim 15, wherein the set of transform pixels correspond to the vertices of the polygonal pattern.

17. The method of claim 15, wherein the dots of light appear at a subset of all of the vertices of the polygonal pattern.

18. The method of claim 13, wherein the polygonal pattern comprises a hexagonal pattern.

19. The method of claim 12, wherein an output of the census transform comprises a vector.

20. The method of claim 19, wherein a structure of the vector is based on the pattern of light.

21. The method of claim 12, wherein the depth data comprises a depth map.

22. A non-transitory computer-readable medium having stored thereon instructions that, when executed by a processor, cause the processor to:
   obtain a first image of an environment, the first image including a pattern of light projected by a light source, wherein the first image is captured by a camera;
   determine a pixel window for a pixel of the first image, the pixel window comprising a set of pixels around the pixel;
   determine a set of transform pixels based on the pattern of light projected by the light source, wherein the set of transform pixels are a subset of pixels from the pixel window;
   perform a census transform based on the pixel and the set of transform pixels to obtain census transform information for the first image; and
   generate depth data based on the census transform information for the first image.

23. The non-transitory computer-readable medium of claim 22, wherein the pattern of light is in a polygonal pattern.

24. The non-transitory computer-readable medium of claim 23, wherein dots of light of the pattern of light appear in portions of the polygonal pattern for the pixel window.

25. The non-transitory computer-readable medium of claim 24, wherein the dots of light appear at vertices of the polygonal pattern.

26. The non-transitory computer-readable medium of claim 25, wherein the set of transform pixels correspond to the vertices of the polygonal pattern.

27. The non-transitory computer-readable medium of claim 25, wherein the dots of light appear at a subset of all of the vertices of the polygonal pattern.

28. The non-transitory computer-readable medium of claim 23, wherein the polygonal pattern comprises a hexagonal pattern.

29. The non-transitory computer-readable medium of claim 22, wherein an output of the census transform comprises a vector.

30. The non-transitory computer-readable medium of claim 29, wherein a structure of the vector is based on the pattern of light.

* * * * *